(12) United States Patent
Frasch et al.

(10) Patent No.: US 7,967,310 B2
(45) Date of Patent: Jun. 28, 2011

(54) WHEEL SUSPENSION FOR THE REAR WHEELS OF A MOTOR VEHICLE (75) Inventors: Wilhelm Frasch, Oberboihingen (DE); Reinhard Kunert, Weissach (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 155 days.

(21) Appl. No.: 12/339,963

(22) Filed: Dec. 19, 2008

(65) Prior Publication Data

US 2009/0160154 A1 Jun. 25, 2009

(30) Foreign Application Priority Data

Dec. 21, 2007 (DE) .......................... 10 2007 063 545

(51) Int. Cl.
B60G 3/18 (2006.01)
B60G 3/26 (2006.01)
(52) U.S. Cl. ........... 280/124.143; 280/86.5; 280/86.757; 280/124.134; 280/124.135; 280/124.138; 280/124.139
(58) Field of Classification Search .......... 280/124.134–280/124.136, 124.138, 124.139, 124.142, 280/124.143, 124.149, 86.5–86.758, 86.751
See application file for complete search history.

(56) References Cited

U.S. PATENT DOCUMENTS

| 4,703,947 | A | * | 11/1987 | Tattermusch et al. | .. 280/124.106 |
| 4,744,586 | A | | 5/1988 | Shibahata et al. | |
| 4,815,755 | A | * | 3/1989 | Takata et al. | ........... 280/124.128 |
| 4,840,396 | A | * | 6/1989 | Kubo | .................... 280/124.143 |
| 4,973,075 | A | * | 11/1990 | Rori et al. | ................. 280/86.757 |
| 5,000,477 | A | * | 3/1991 | Minakawa et al. | .... 280/124.136 |
| 5,048,858 | A | * | 9/1991 | Luger | .................... 280/124.136 |
| 5,116,076 | A | * | 5/1992 | Moll | ...................... 280/124.138 |
| 5,415,427 | A | * | 5/1995 | Sommerer et al. | ..... 280/124.142 |
| 5,499,839 | A | * | 3/1996 | Wahl et al. | ............. 280/124.145 |
| 6,752,409 | B1 | | 6/2004 | Kunert | |
| 7,258,355 | B2 | * | 8/2007 | Amano | .................. 280/124.134 |

(Continued)

FOREIGN PATENT DOCUMENTS

DE 3642421 C2 6/1987

(Continued)

OTHER PUBLICATIONS

Ludwig Seethaler, Independent Wheel Suspension for Driven Rear Wheels of Motor Vehicle, Apr. 3, 1997, German Patent Office, DE 19535923 Al, Machine Translation of Description.*

(Continued)

Primary Examiner — Ruth Ilan
Assistant Examiner — James English (57) ABSTRACT

A wheel suspension for the rear wheels of a motor vehicle is created, with three links being provided in an upper link plane, and with a foremost link as viewed in the direction of travel being provided as a track rod and the two further links being provided as separate individual links at both sides of a vertical wheel central transverse plane. A triangular link is arranged in the lower link plane, which triangular link holds a spiral or air spring and a damper strut spaced apart from one another. By corresponding pole formations defined by the links, elastokinematic or imaginary pivot axes are formed, which permits an elastokinematic adjustment of the wheel in a toe-in sense under the influence of braking forces, side forces and load shift forces. The wheel suspension is also configured such that an elastokinematic adjustment of the wheel in a toe-out sense is obtained in the event of wheel loads and drive forces.

13 Claims, 5 Drawing Sheets

U.S. PATENT DOCUMENTS 7,281,716 B2 * 10/2007 Fanson .................... 280/5.52
7,766,344 B2 * 8/2010 Buma .................... 280/5.511

FOREIGN PATENT DOCUMENTS

| DE | 19535923 | A1 | 4/1997 |
| DE | 10005407 | A1 | 9/2000 |
| DE | 10111135 | A1 | 9/2002 |
| DE | 102004024899 | A1 | 12/2005 |
| EP | 1364816 | A2 * | 11/2003 |

OTHER PUBLICATIONS

German Patent and Trademark Office Search Report dated Sep. 26, 2008.

* cited by examiner

WHEEL SUSPENSION FOR THE REAR WHEELS OF A MOTOR VEHICLE

CROSS-REFERENCE TO RELATED APPLICATION

This application claims the priority, under 35 U.S.C. §119, of German application DE 10 2007 063 545.3, filed Dec. 21, 2007; the prior application is herewith incorporated by reference in its entirety.

BACKGROUND OF THE INVENTION

Field of the Invention

The invention relates to a wheel suspension for the rear wheels of a motor vehicle.

Published, non-prosecuted German patent application DE 100 05 407 A1, corresponding to U.S. Pat. No. 6,752,409, describes a wheel suspension which likewise contains a lower triangular link and an upper track rod and two further individual links. The wheel suspension, on account of the triangular link being situated laterally adjacent to the individual links, has a relatively large spatial requirement in the limited installation space of the vehicle. Also, as a result of the position of the triangular link, an extreme V-shape of the individual links and a crossing with the track rod are necessary. The design may possibly lead, in the event of tilting forces on the wheel carrier, to hardening of the bearing elasticities, which could also lead to an influence on the changes in wheel position under the influence of braking forces, side forces and drive forces. Published, non-prosecuted German patent application DE 100 05 407 A1 describes in particular a wheel suspension for the rear wheels of a motor vehicle which likewise contains three individual links in an upper plane and a triangular link in a lower plane, on which triangular link a damper and spring strut is supported.

SUMMARY OF THE INVENTION

It is accordingly an object of the invention to provide a wheel suspension for the rear wheels of a motor vehicle that overcomes the above-mentioned disadvantages of the prior art devices of this general type, by which it is possible to obtain a compact, space-saving design of the wheel suspension unit in the vehicle. Furthermore, it is intended to obtain an optimum positioning of the links with articulation points at the wheel carrier side and body side in order to avoid any adverse effect on the driving behavior in the event of forces, such as for example braking forces, side forces and drive forces, acting on the wheel.

With the foregoing and other objects in view there is provided, in accordance with the invention, a wheel suspension for rear wheels of a motor vehicle. The wheel suspension contains four links including a triangular link and three separate links. One of the three separate links is a track rod and the remaining two links are two other links. A wheel carrier is guided by the four links which are held on a wheel carrier side and on a body side. A damper strut and a spring being either an air spring or a spiral spring are provided. The triangular link is disposed in a lower link plane and the three separate links are disposed in an upper link plane, and with it being possible, as a result of pole formations defined by the links, for a wheel to be elastokinematically adjusted in a toe-in sense and a toe-out sense under action of forces. The triangular link has a body side front mount being articulatedly connected to the wheel carrier, in relation to a direction of travel, behind a vertical wheel central transverse plane and below a horizontal wheel central plane. The triangular link holds the damper strut and the spring which is spaced apart from the damper strut, in a supporting fashion. And, as viewed in the direction of travel, the track rod is disposed in front of the vertical wheel central transverse plane in the upper link plane, and in that in each case one of the separate links is disposed at both sides of the vertical wheel central transverse plane. The separate links are aligned at different angles so as to diverge from the wheel carrier in a direction of a vehicle body and define the upper link plane.

The object is achieved according to the invention in that the triangular link is articulatedly connected to the wheel carrier—in relation to the direction of travel—behind a vertical wheel central transverse plane and below a horizontal wheel central plane in a mount, and holds a damper strut, and an air or steel spiral spring which is spaced apart from the damper strut, in a supporting fashion. As viewed in the direction of travel, an individual link which is embodied as a track rod is arranged in front of the wheel central transverse plane in the upper link plane, and in each case one individual link is arranged at both sides of the vertical wheel central transverse plane, which individual links are aligned at different angles so as to diverge from the wheel carrier in the direction of the vehicle body and likewise form the upper link plane. In this way, a wheel suspension is advantageously created which, while having a space-saving arrangement, provides targeted wheel guidance under the influence of forces acting on the wheel.

A contribution to optimum wheel guidance is provided by the arrangement of the wheel guide links in the lower and in the upper link planes, which arrangement generates targeted pole formation and therefore forms corresponding imaginary and elastokinematic axes which bring about a substantial influence on the wheel positioning in the direction of toe-in and/or toe-out.

In order to achieve this, the track rod has an articulation point on the wheel carrier, which articulation point is situated above a horizontal wheel central transverse plane, with the articulation points of the two individual links to the wheel carrier being situated above the articulation point of the track rod on the wheel carrier. The body-side mount points of the two individual links form a body-side pivot axis which runs in the vehicle longitudinal direction and which, as viewed in the direction of travel, is aligned at an acute angle with respect to the vertical wheel central longitudinal plane and with respect to the wheel-carrier-side pivot axis through the mounts of the individual links. In particular, the track rod and the individual link which—as viewed in the direction of travel—is arranged in front of the vertical wheel central transverse plane are arranged at different heights and so as to be approximately parallel to one another and have an approximately equal length and the body-side and wheel-carrier-side articulation points lie virtually in parallel vertical planes.

The two individual links have a first, upper pole for an elastokinematic pivot axis, which pole—as viewed in the direction of travel—is situated in front of a vertical wheel central transverse plane and outside the tread width of the wheel. The triangular link and the track rod form a second, lower pole for the elastokinematic pivot axis in the wheel contact plane, which pole is situated outside the tread width. For a targeted change in position of the wheel under the influence of forces, the body-side mount of the track rod and the body-side—as viewed in the direction of travel—front mount of the triangular link have a softer characteristic than the body-side mounts of the individual links and of the further mount of the triangular link.

The links of the wheel suspension are aligned with respect to one another and have mount characteristics such that an imaginary or elastokinematic pivot axis is generated by the poles formed, in such a way that the wheel can be elastokinematically adjusted in the direction of toe-in under the influence of braking forces and load shift forces and that the wheel can be elastokinematically adjusted in the direction of toe-out under the influence of wheel loads and drive forces. The pole in the wheel contact plane for the adjustment of the wheel in the event of braking forces and the pole for the adjustment of the wheel in the event of load shift forces are situated outside the tread width and—with respect to the direction of travel—in front of the vertical wheel central transverse plane.

Furthermore, the pole in the wheel contact plane for the elastokinematic adjustment of the wheel in a toe-in sense is formed by an imaginary pivot axis which runs through the wheel-carrier-side mount of the triangular link and through an upper pole formed by the individual links situated at the front and at the rear.

As a result of the arrangement of the links with respect to one another in the upper and lower link planes, it is thereby possible for wheel pivot axes and therefore also corresponding poles to be formed which generate a targeted adjustment of the wheel in a toe-in sense and a toe-out sense.

Other features which are considered as characteristic for the invention are set forth in the appended claims.

Although the invention is illustrated and described herein as embodied in a wheel suspension for the rear wheels of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
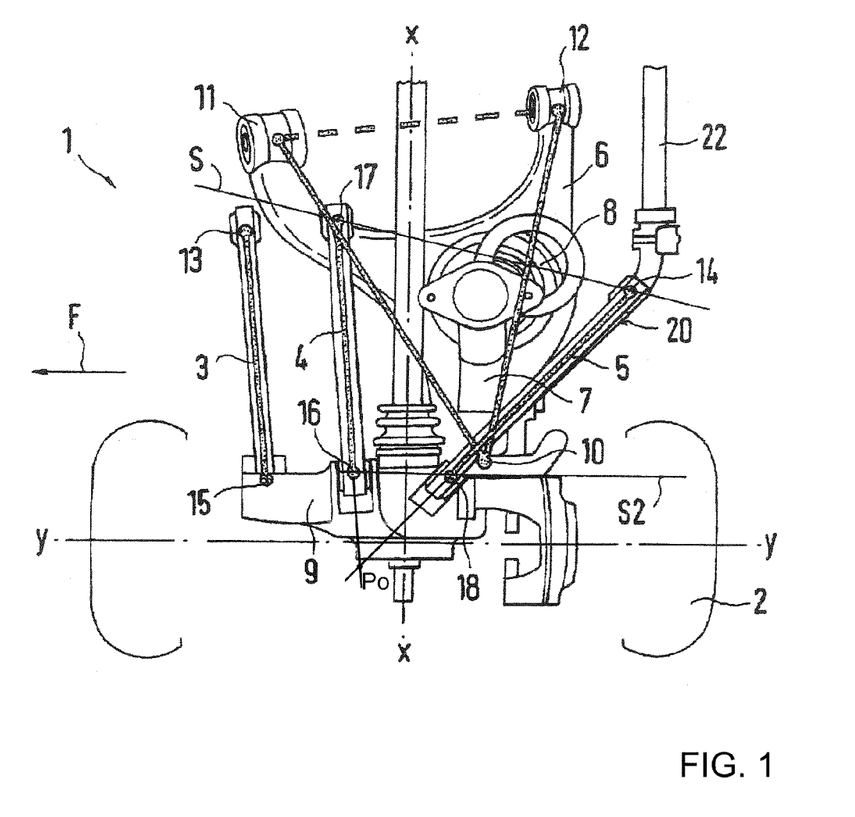
FIG. 1 is a diagrammatic, plan view of a wheel suspension with individual links arranged in an upper link plane and a triangular link arranged in a lower link plane according to the invention.
Figure 3:
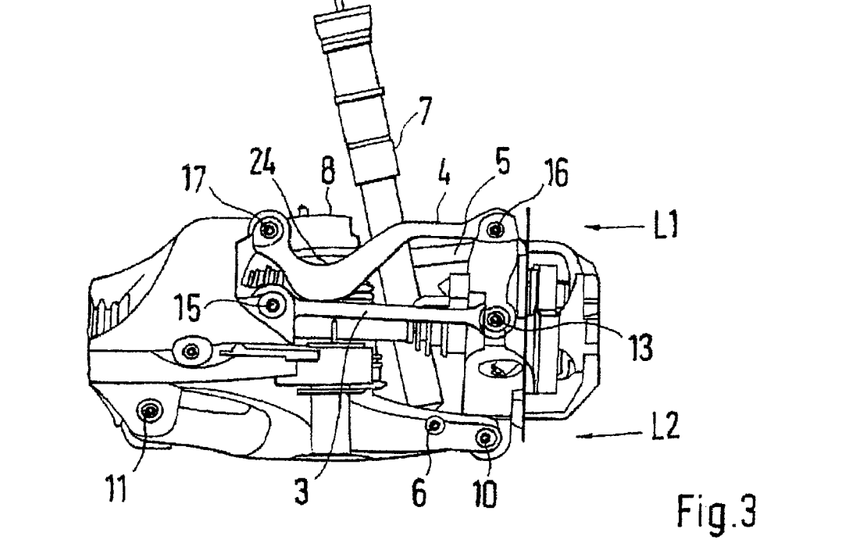
FIG. 3 is a diagrammatic, front view of the wheel suspension, counter to the direction of travel.
Figure 4:
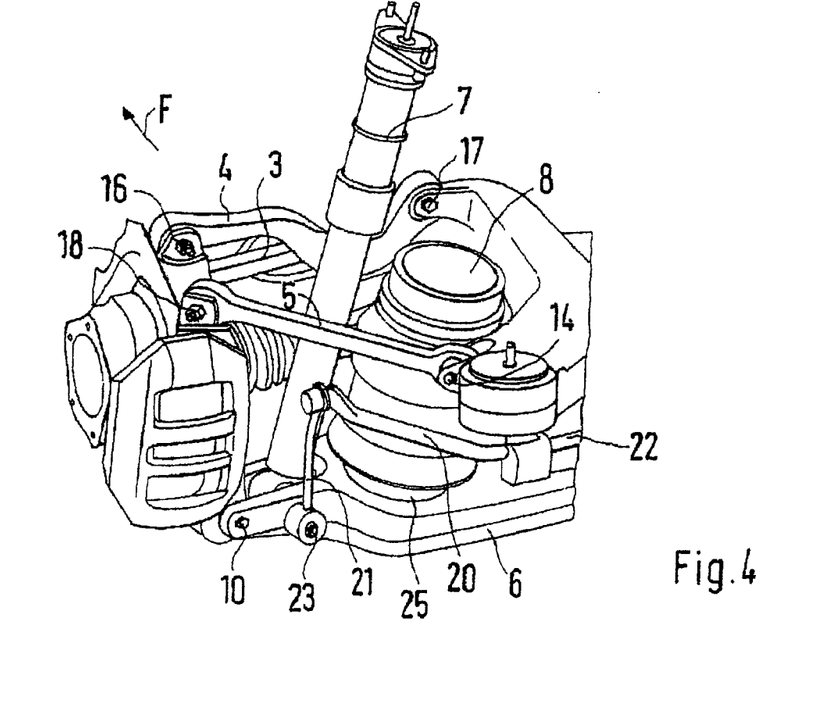
FIG. 4 is a diagrammatic, top and rear perspective view of the wheel suspension.

Referring now to the figures of the drawing in detail and first, particularly, to FIGS. 1 and 3 thereof, there is shown a wheel suspension 1 for rear wheels 2 of a motor vehicle. The suspension 1 contains, in an upper link plane L1, three separate individual links 3, 4 and 5, with the one individual link 3 forming a track rod. A lower link plane L2 is formed by a triangular link 6 which supports a damper strut 7 and, separately from the latter, an air spring or spiral spring 8.

In the lower link plane L2, the triangular link 6 is articulatedly connected to a wheel carrier 9—with respect to a direction of travel F—behind a vertical wheel central transverse plane x-x and below a horizontal wheel central plane z-z in a wheel-carrier-side mount 10. The triangular link 6 is arranged directly below the individual links 3, 4 and 5 and body-side mounts 11 and 12 are situated within, or are spatially delimited by, the outer track rod 3 and the outer individual link 5.

The track rod 3 and the first individual link 4 are arranged, and articulatedly connected at articulation points 15, 16 to mounts on the wheel carrier 9 and in the mounts 13 and 17 at the body side, in front of the vertical wheel central transverse plane x-x as viewed in the direction of travel F. The further individual link 5 of the upper link plane L1 is—with respect to the direction of travel F—arranged behind the vertical wheel central transverse plane x-x and is held on the wheel carrier 9 in a mount 18 and at the body side in the mount point 14.

Figure 2:
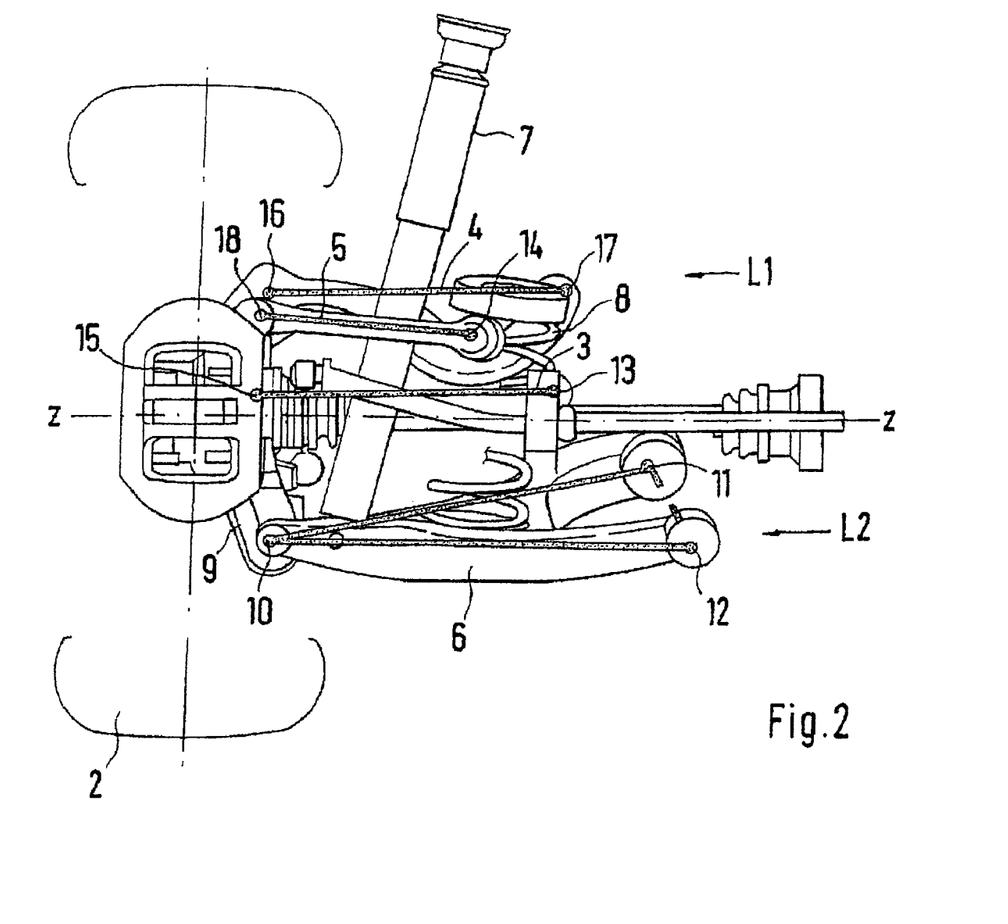
FIG. 2 is a diagrammatic, rear view of the wheel suspension—in a direction of travel.

The track rod 3 is arranged slightly below the individual links 4 and 5 in terms of height with the articulation points 13 and 15 and, as viewed in the height direction (FIG. 2), the rear individual link 5 is provided between the track rod 3 and the central individual link 4, and the articulation points 18 and 14 and 16 and 17 are also arranged correspondingly. The body-side mount points 14 and 17 of the two individual links 5 and 4 form a longitudinally running, body-side pivot axis S (FIG. 1) which is aligned at an acute angle with respect to the vertical wheel central longitudinal plane y-y.

The links 3, 4, 5 and 6 of the wheel suspension 1 are aligned with respect to one another and have mount characteristics matched to one another such that poles P can be formed, which poles P generate imaginary and elastokinematic axes for the wheel positioning. In this way, it is possible for the wheels 2 to be elastokinematically adjusted in the direction of toe-in under the influence of braking forces B, load shift forces L and in the event of side forces S, and for the wheels to be elastokinematically adjusted in the direction of toe-out under the influence of wheel loads and drive forces.

Figure 5:
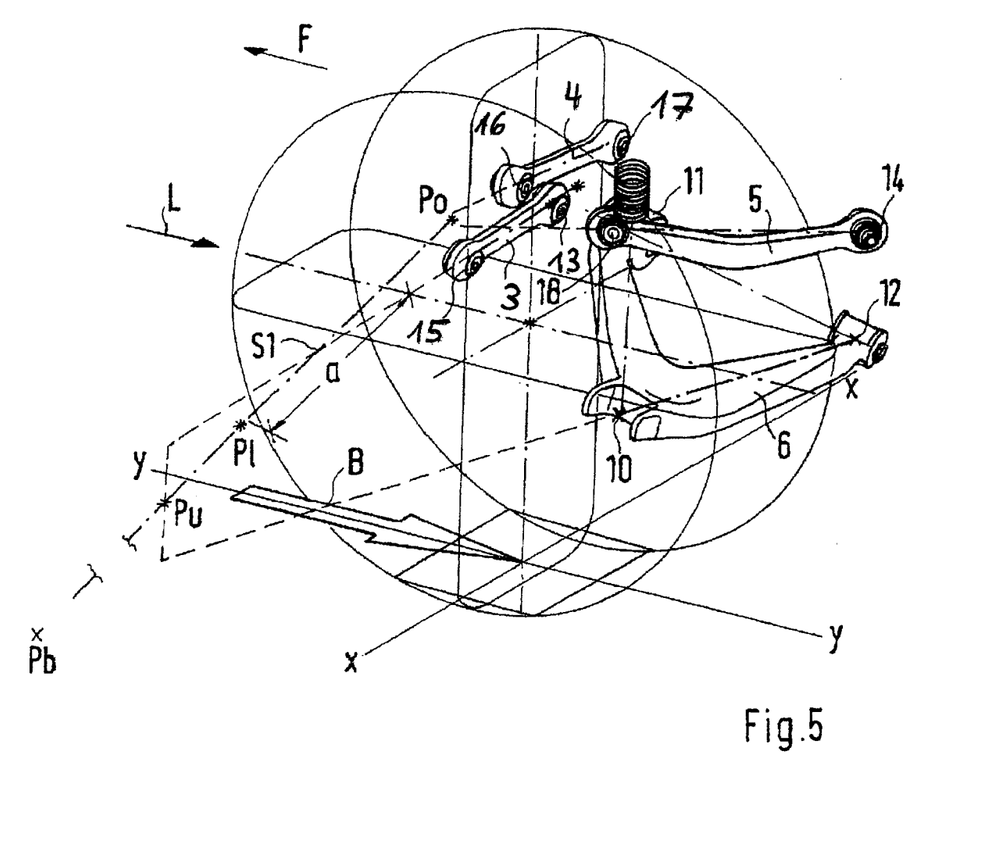
FIG. 5 is a diagrammatic, perspective view of the wheel suspension with an elastokinematic pivot axis for brake forces and load shift forces.

The two individual links 4 and 5 (FIG. 5) form an upper pole Po and the triangular link 6 with the track rod 3 forms a lower pole Pu. An elastokinematic pivot axis S1 with a pole Pb in the wheel contact plane is formed between the poles Po and Pu, such that, under the influence of braking forces B and load shift forces L, an adjustment of the vehicle wheel takes place in the direction of toe-in in the event of braking forces B about the pole Pb and in the event of load shift forces L about the pole Pl. The pole Pl is the point of intersection of the elastokinematic pivot axis with the horizontal wheel central plane z-z. The poles are situated outside the tread width and, as viewed in the direction of travel F, in front of the vertical wheel central transverse plane x-x.

Figure 6:
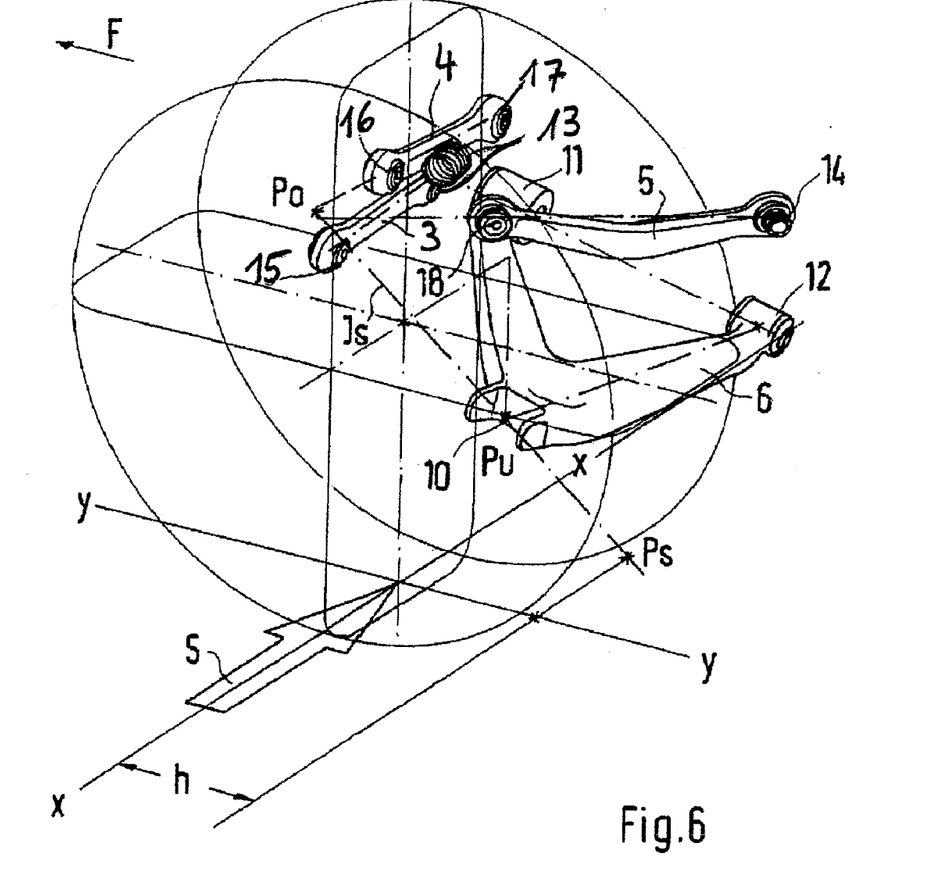
FIG. 6 is a diagrammatic, perspective view of the wheel suspension with an elastokinematic pivot axis for side forces.

The pole Ps in the wheel contact plane for the elastokinematic adjustment of the wheel 2 in the direction of toe-in in the event of a side force S is formed by an imaginary pivot axis Is. The imaginary pivot axis Is runs through an upper pole Po formed by the individual links 4 and 5. A further pole Pu is formed by the wheel-carrier-side mount 10 of the triangular link 6. On account of the lever arm h generated between the vertical wheel central transverse plane x-x and the pole Ps in the wheel contact plane, an elastokinematic adjustment of the wheel in the direction of toe-in can take place in the event of a side force S.

The individual link 5 which is situated at the rear is arranged above a stabilizer arm 20 of a stabilizer 22 and has an identical profile to the stabilizer arm 20, as a result of which a small installation space is required. A hanger 21 of the stabilizer 22 is connected to the triangular link 6 by a screw 23. The screw 23 simultaneously fastens the spring strut 7 to the triangular link 6.

The individual link 4 has a curved indentation 24 which is composed of a hollow and which extends over a part of the length of the link 4. The hollow offers a free space for a longitudinal beam of the vehicle body to run through.

The air spring or steel spiral spring 8 is held in a supported fashion in the triangular link 6 within a recess 25.

The track rod 3 and the individual links 5 have the same length and may therefore be configured as so-called identical parts. If the indentation 24 in the individual link 4 is not required, the three links 3, 4 and 5 may all be formed as identical parts.

The invention claimed is:

1. A wheel suspension for rear wheels of a motor vehicle, the wheel suspension comprising:
    four links including a triangular link and three separate links, one of said three separate links being a track rod and remaining two links being two other links;
    a wheel carrier being guided by said four links which are held on a wheel carrier side and on a body side;
    a damper strut;
    a spring selected from the group consisting of air springs and spiral springs;
    said triangular link disposed in a lower link plane and said three separate links being disposed in an upper link plane and above a horizontal wheel central plane, and with it being possible, as a result of pole formations defined by means of said links, for a wheel to be elastokinematically adjusted in a toe-in sense and a toe-out sense under action of forces; and
    said triangular link having a body side front mount being articulatedly connected to said wheel carrier, in relation to a direction of travel, behind a vertical wheel central transverse plane and below the horizontal wheel central plane, said triangular link holding said damper strut and said spring which is spaced apart from said damper strut, in a supporting fashion, and in that, as viewed in the direction of travel, said track rod is disposed in front of the vertical wheel central transverse plane in the upper link plane, and in that in each case one of said separate links is disposed at both sides of the vertical wheel central transverse plane, said separate links being aligned at different angles so as to diverge from said wheel carrier in a direction of a vehicle body and define the upper link plane.

2. The wheel suspension according to claim 1, wherein said track rod has an articulation point on said wheel carrier, said articulation point is situated above the horizontal wheel central plane, and said two other links have further articulation points to said wheel carrier being situated above said articulation point of said track rod on said wheel carrier.

3. The wheel suspension according to claim 2, wherein said two other links have body-side mount points which define a body-side pivot axis which runs in a vehicle longitudinal direction and which, as viewed in the direction of travel, is correspondingly aligned at an acute angle with respect to a vertical wheel central longitudinal plane and with respect to a wheel-carrier-side pivot axis through said further articulation points of said two other links.

4. The wheel suspension according to claim 3, wherein a foremost of said links has an indentation formed therein which is composed of a hollow which extends from said body-side mount point to a straight link arm part which is mounted to said wheel carrier at the further articulation point.

5. The wheel suspension according to claim 2, wherein said two other links form a first, upper pole for an elastokinematic pivot axis, the upper pole—as viewed in the direction of travel—is situated in front of the vertical wheel central transverse plane and outside a tread width of the wheel.

6. The wheel suspension according to claim 5, wherein said triangular link and said track rod form a second, lower pole for the elastokinematic pivot axis, and the elastokinematic pivot axis is situated with a further pole in a wheel contact plane outside the tread width and with respect to the vertical wheel central transverse plane.

7. The wheel suspension according to claim 6, wherein the further pole in the wheel contact plane is designed for an adjustment of the wheel in an event of braking forces, and an other pole on the elastokinematic pivot axis is designed for an adjustment of the wheel in an event of load shift forces, and the further pole and the other pole are situated in front of the vertical wheel central transverse plane and outside the tread width.

8. The wheel suspension according to claim 1, wherein one of said two other links is situated behind the vertical wheel central transverse plane as viewed in the direction of travel, of the upper link plane, and is disposed at an angle of approximately 45° with respect to the vertical wheel central transverse plane and has an overlapping, identical profile to a stabilizer arm which runs below said one link and which is spaced apart in terms of height.

9. The wheel suspension according to claim 1, wherein said links are aligned with respect to one another and have mount characteristics such that axes which are formed by poles are generated, in such a way that the wheel can be elastokinematically adjusted in a direction of toe-in under an influence of braking forces, load shift forces and in an event of side forces, and that the wheel can be elastokinematically adjusted in the direction of toe-out under an influence of wheel loads and drive forces.

10. The wheel suspension according to claim 9, wherein:
    said links include a front link and an individual link; and
    a pole in a wheel contact plane for an elastokinematic adjustment of the wheel in the toe-in sense in an event of a side force is formed by an imaginary pivot axis which runs through said body side front mount of said triangular link and through an upper pole formed by said front link and said individual link which is situated at a rear.

11. The wheel suspension according to claim 1, wherein said triangular link has a receptacle for holding a lower end of said spring.

12. The wheel suspension according to claim 1, further comprising:
    a screw; and
    a stabilizer having a hanger held in said triangular link by means of said screw which is formed simultaneously as a bearing screw for said damper strut.

13. A wheel suspension for rear wheels of a motor vehicle, the wheel suspension comprising:
    four links including a triangular link and three separate links, one of said three separate links being a track rod and remaining two links being two other links;
    a wheel carrier being guided by said four links which are held on a wheel carrier side and on a body side;
    a damper strut;
    a spring selected from the group consisting of air springs and spiral springs;

said triangular link disposed in a lower link plane and said three separate links being disposed in an upper link plane, and with it being possible, as a result of pole formations defined by means of said links, for a wheel to be elastokinematically adjusted in a toe-in sense and a toe-out sense under action of forces;

said triangular link having a body side front mount being articulatedly connected to said wheel carrier, in relation to a direction of travel, behind a vertical wheel central transverse plane and below a horizontal wheel central plane, said triangular link holding said damper strut and said spring which is spaced apart from said damper strut, in a supporting fashion, and in that, as viewed in the direction of travel, said track rod is disposed in front of the vertical wheel central transverse plane in the upper link plane, and in that in each case one of said separate links is disposed at both sides of the vertical wheel central transverse plane, said separate links being aligned at different angles so as to diverge from said wheel carrier in a direction of a vehicle body and define the upper link plane;

said track rod having an articulation point on said wheel carrier, said articulation point situated above the horizontal wheel central plane, and said two other links have further articulation points to said wheel carrier being situated above said articulation point of said track rod on said wheel carrier; and said track rod and one of said two other links which—as viewed in the direction of travel—is disposed in front of the vertical wheel central transverse plane, are disposed at different heights and so as to be approximately parallel to one another and have an approximately equal length and have body-side articulation points and wheel-carrier-side articulation points and which lie virtually in parallel vertical planes.

* * * * *